Feb. 12, 1963 V. J. EVICH 3,076,997
AUTOMATIC DRESSING APPARATUS
Filed May 8, 1959 5 Sheets-Sheet 1

INVENTOR.
VINCENT J. EVICH
BY
ATTORNEY

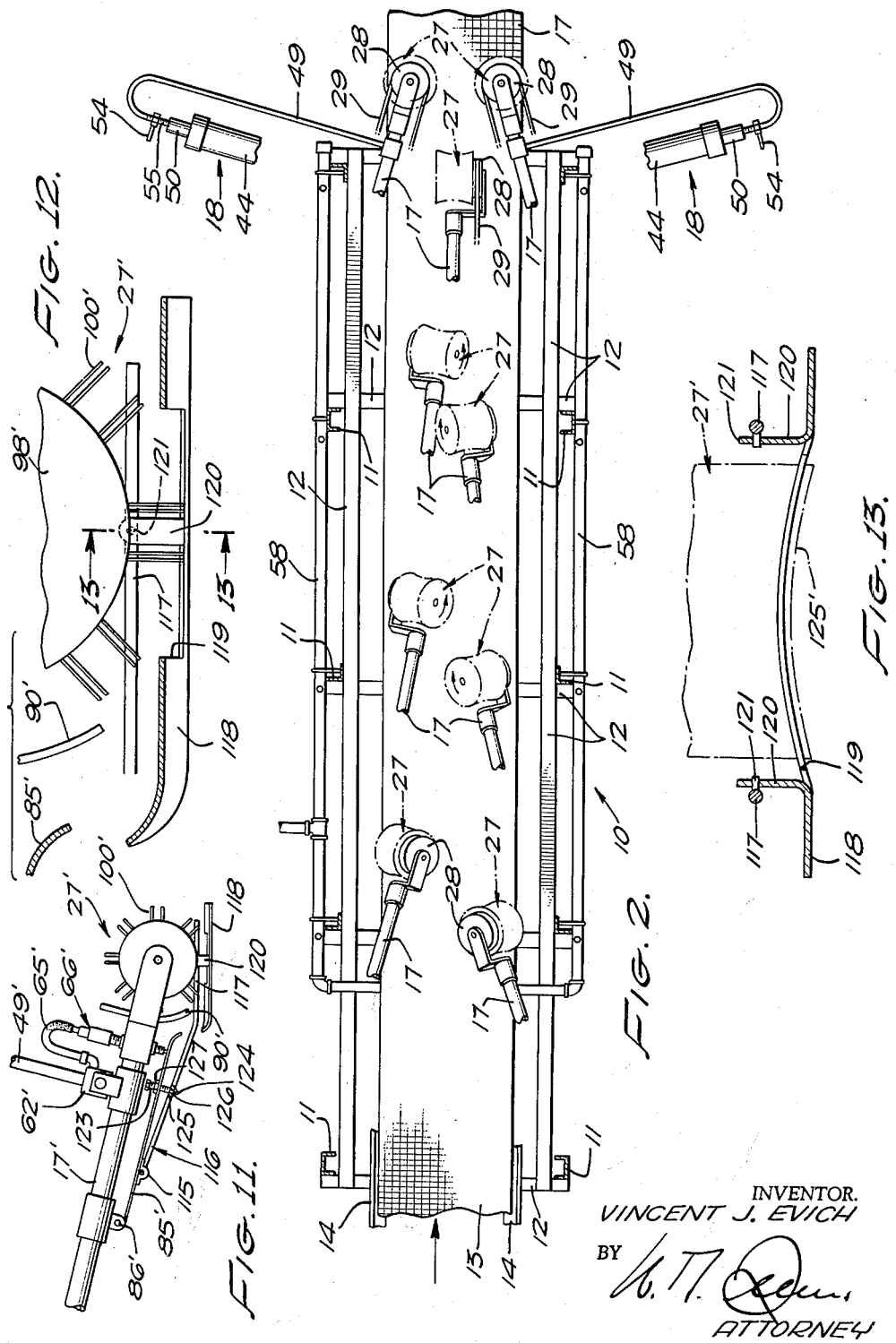

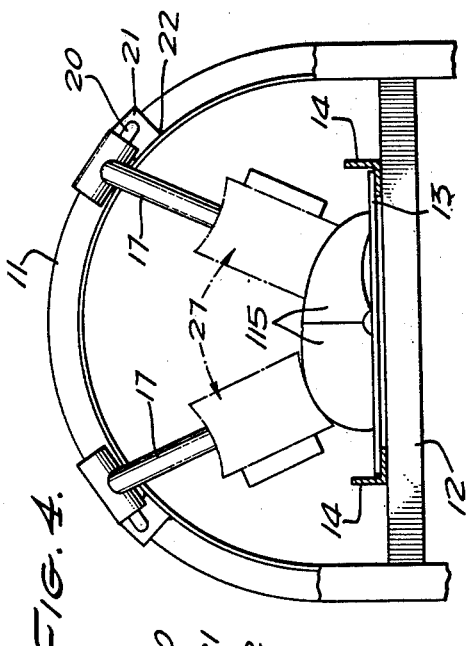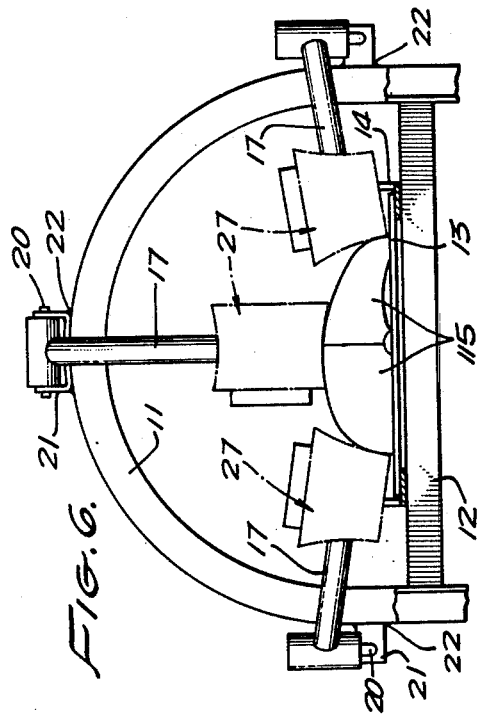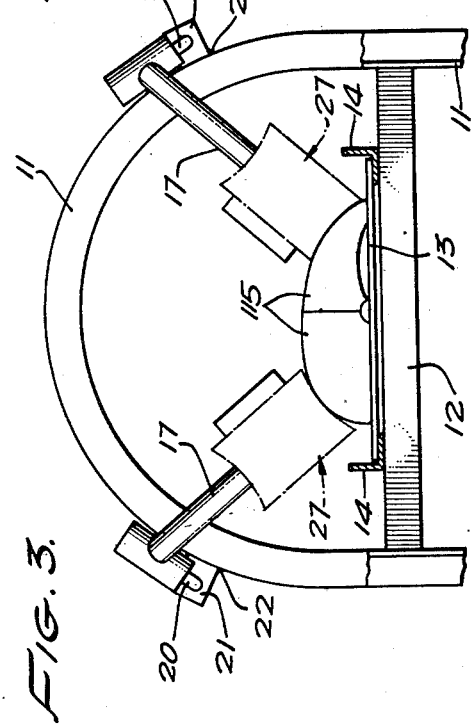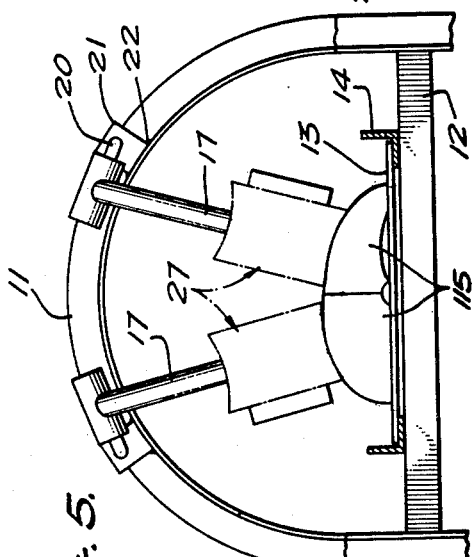

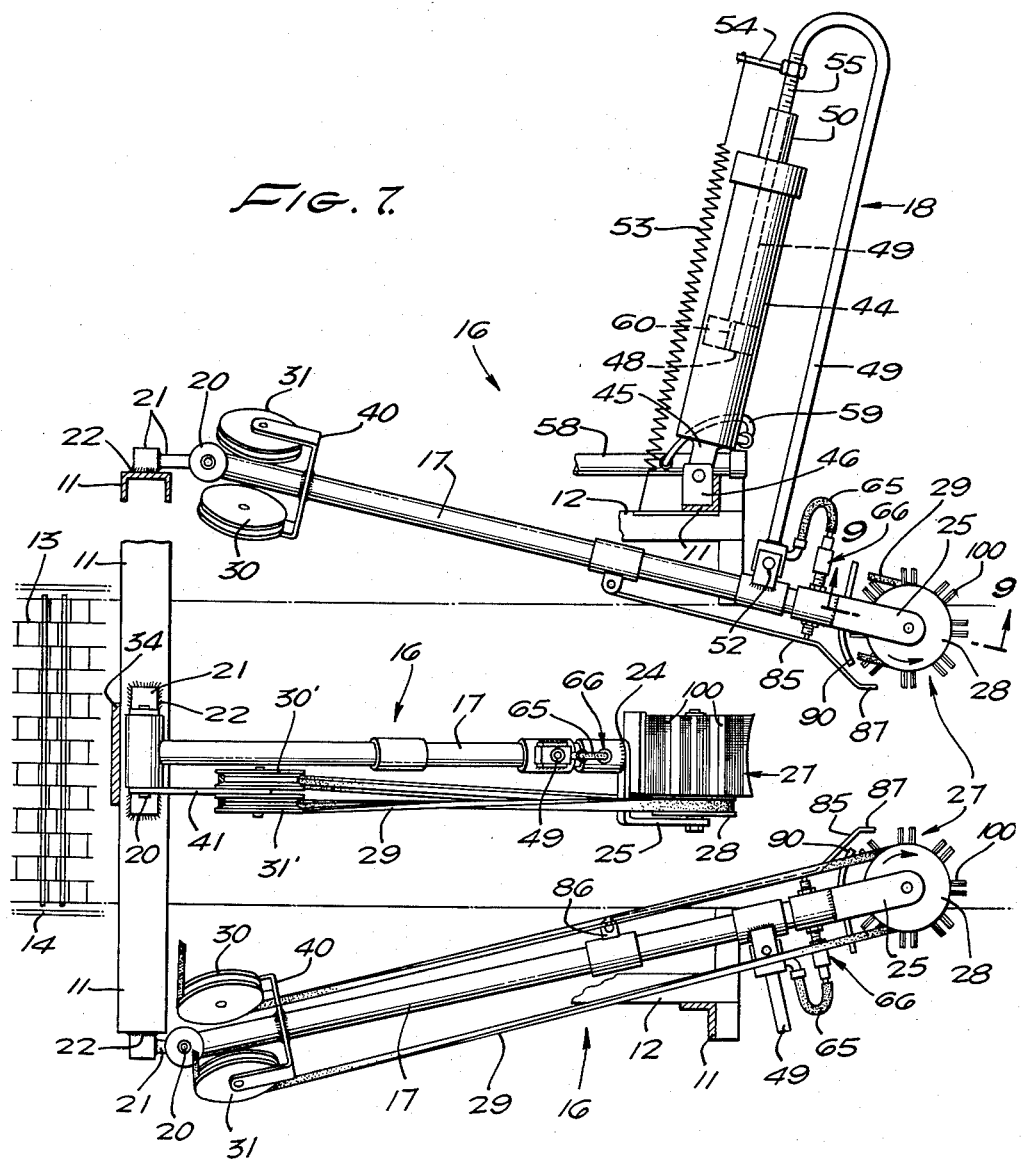

Feb. 12, 1963  V. J. EVICH  3,076,997
AUTOMATIC DRESSING APPARATUS
Filed May 8, 1959  5 Sheets-Sheet 5
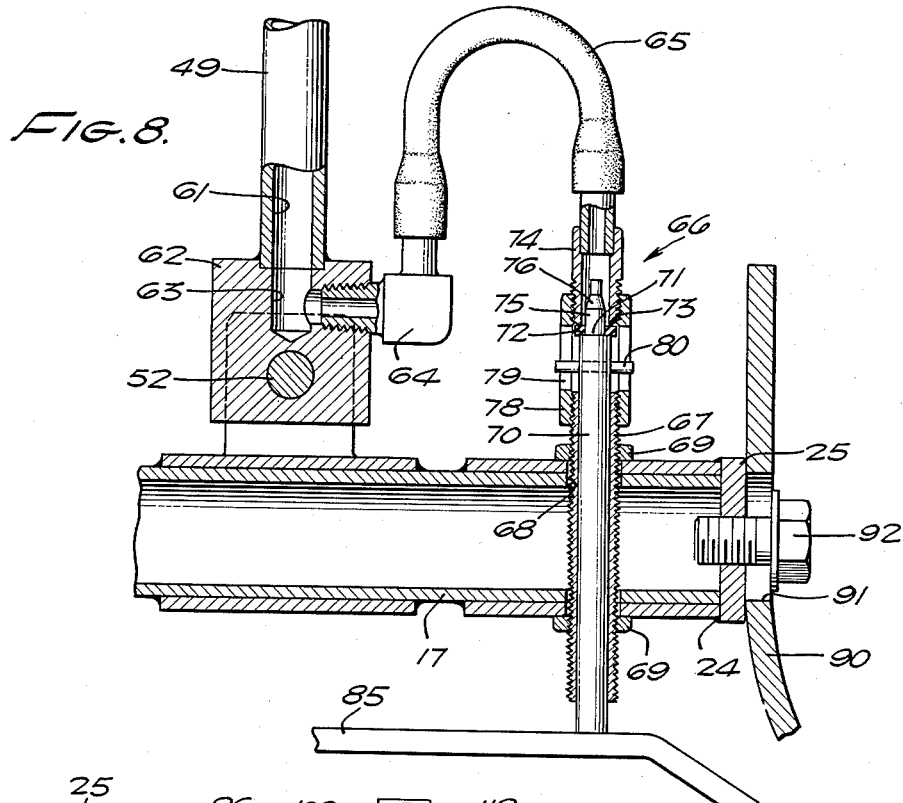
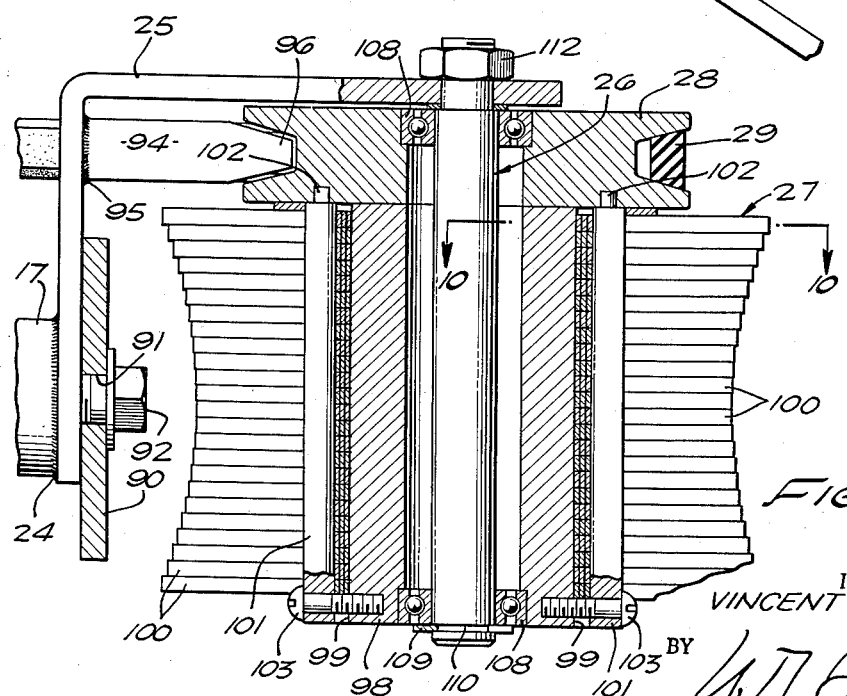
INVENTOR.
VINCENT J. EVICH
BY
ATTORNEY

United States Patent Office 3,076,997
Patented Feb. 12, 1963

3,076,997
AUTOMATIC DRESSING APPARATUS
Vincent J. Evich, 1315 Leland St., San Pedro, Calif.
Filed May 8, 1959, Ser. No. 812,017
22 Claims. (Cl. 17—2)

This invention relates to power driven surface dressing apparatus and more particularly to an automatic machine especially designed for dressing the surfaces of irregularly shaped articles to remove a surface layer with precision and uniformity despite wide variations in the shape and size thereof and is particularly suitable for use in dressing fish and meat effectively and efficiently without need for manual labor or supervision of any kind.

As will be appreciated from a consideration of this disclosure, the apparatus and technique provided by the present invention may be utilized in processing and dressing a large variety of irregularly contoured bodies of widely different materials. However, it is particularly suitable for use in dressing relatively soft and pliant bodies to remove a surface layer therefrom to any predetermined depth. A preferred embodiment of the invention is specially suitable for removing scale, skin and the associated connective tissue of fish and will be herein disclosed in detail by way of example.

Heretofore it has been comon practice to dress fish by hand labor using such hand-held and manipulated tools as found suitable for this purpose. Attempts have been made to use automatic power equipment, but these have been discouraging and subject to many disadvantages and shortcomings sought to be avoided by the present invention. The reasons have been manifold and are bottomed in large part on the wide variation in the size and contour of fish required to be processed. Furthermore, the firmness and texture of the surface area to be removed as well as of the underlying flesh varies widely thereby seriously increasing the complexities and variables. In consequence, dressing equipment heretofore proposed has been lacking in the desired versatility, sensitivity and capability of adjusting the cutting tools automatically and with precision to the widely varying conditions encountered in practice. Waste of the edible meat cannot be tolerated in the highly competitive fish-packing industry, nor is it permissible to allow objectionable portions of the surface areas to remain attached to the edible portions since the cost of the labor required for inspection and removal of objectionable portions offsets the advantages which would otherwise accrue from the use of automatic dressing equipment.

In an effort to avoid both wastage and the presence of undressed areas, various proposals have been made including devices responsive to reflected light to monitor the area being dressed for controlling the position of the dressing tool in a manner to remove all objectionable portions. Such equipment, however, leaves much to be desired because lacking in many respects including adequate sensitivity and speed of response to changing conditions.

With the foregoing defects and shortcomings of prior equipment in mind, it is a primary object of the present invention to provide automatic dressing equipment utilizing a servo-type surface feeler and control mechanism positioned in direct alignment with or closely adjacent the power operated dressing tool and instantly responsive to changes in the shape, contour and height of the surface being dressed above a datum plane to maintain the dressing tool accurately positioned to remove with precision and uniformity a predetermined surface layer from the object being dressed. The position of the dressing tool is controlled solely by directions provided by a sensing feeler effective to transmit the proper corrective signal to the power-actuated positioning mechanism. The dressing equipment provided by the present invention accommodates the widest range of sizes and contour of pieces to be dressed without need for classifying equipment of any nature and is operable with equal facility and reliability irrespective of the order in which pieces of widely differing sizes and shapes are conveyed in succession past the dressing tools.

In a preferred arrangement, the fish fillets, meat, or other body or object to be dressed are mounted on a broad mesh-type conveyor belt having arranged therealong a plurality of independent and automatically positioned dressing tools each operable to surface-dress a given longitudinal strip of the body as it is conveyed through the apparatus. Desirably, the power-driven dressing rollers are mounted in pairs lengthwise of the conveyor and are movable in planes similarly but oppositely inclined to the upper surface of the conveyor to the end that a given pair of dressing rollers cooperate in pressing the piece undergoing dressing into firm anti-skid contact with the conveyor belt.

The separate power actuated means controlling the position of each dressing tool and operative to hold these firmly in any desired position but without interference with the instant adjustment of the tool toward or away from the belt, includes a pneumatic cylinder having one end anchored to the support and the opposite and movable end connected with the dressing tool. An associated sensing feeler is mounted adjacent the cutting tool, operates a bleeder valve controlling the escape of pressurized fluid supplied to the cylinder. So long as the rate of fluid escape from the cylinder equals the rate of fluid supply, the dressing tool remains rigidly in the same adjusted position. However, an increase or a decrease in the rate of fluid escape immediately effects a corresponding raising or lowering of the dressing tool and in such direction as tends to restore and maintain the escape rate exactly equal to the rate of fluid supply. Suitable means are provided for supplying the pneumatic cylinders with air at constant pressure and a spring, counterweight, or the like, is also employed to oppose the action of the pressurized fluid on the cylinder piston.

Accordingly, it is a primary object of the present invention to provide an improved automatic dressing machine for removing a surface layer of predetermined thickness from irregularly shaped and sized objects as these objects are transported past the dressing station.

Another object of the invention is the provision of a power-driven automatic machine for dressing fish fillets, pieces of meat and the like by removing a surface layer of any desired uniform thickness and in which the position of the dressing tool is subject to control by mechanical feeler means in contact with a surface area immediately adjacent the area undergoing dressing and so positioned as to sense the depth of dressing being effected independently of changing surface contours to either side thereof taken in the direction of travel.

Another object of the invention is the provision of the surface dressing apparatus utilizing a plurality of power-driven dressing tools, the positions of each being subject to control by an associated feeler device operatively connected to power-actuated positioning means for the dressing tool.

Another object of the invention is the provision of automatic surface dressing equipment having pairs of automatically positioned dressing tools movably supported for movement toward and away from a conveyor and from the opposed lateral sides of an object undergoing dressing as it is conveyed along a path passing between said pairs of dressing tools.

Another object of the invention is the provision of an improved surface sensing member in operative association with a specially constructed valve operable to control a power cylinder effective to adjust the position of a power-driven dressing tool.

Another object of the invention is the provision of an automatic surface dressing machine having a conveyor for objects to be dressed and featuring pairs of power-driven independently-positioned dressing tools spaced lengthwise of the conveyor and movable in planes inclined to the surface of the conveyor in such manner as to hold the objects in place while surface dressing the exposed surfaces as the objects are conveyed past the dressing tools.

These and other more specific objects will appear upon reading the following specification and claims and upon considering in connection therewith the attached drawings to which they relate.

Referring now to the drawings in which a preferred embodiment of the invention is illustrated:

FIGURE 2 is a fragmentary cross-sectional view taken along line 2—2 on FIGURE 1 and indicating the general relative positions of the various dressing tools with respect to the underlying conveyor belt;

FIGURES 3, 4, 5 and 6 are fragmentary sectional views on an enlarged scale taken along lines 3—3, 4—4, 5—5, 6—6, respectively, on FIGURE 1, and indicating the different relative positions of the pairs of dressing tools at the respective dressing stations and the manner in which the several pairs cooperate in removing an exterior surface layer of a fish fillet;

FIGURE 7 is a fragmentary plan view on an enlarged scale showing the three dressing tools at the discharge end of the machine as well as the power-actuated support for a typical one of the dressing tools and the sensing mechanism associated therewith for controlling the tool position relative to the surface of an object to be dressed;

FIGURE 8 is a fragmentary longitudinal sectional view on an enlarged scale through the automatic control valve and the associated feeler for actuating the same;

FIGURE 9 is a longitudinal sectional view on an enlarged scale through one of the dressing tools showing construction details and taken along line 9—9 on FIGURE 7;

FIGURE 10 is a fragmentary sectional view showing a constructional detail of the dressing rollers and taken along line 10—10 on FIGURE 9;

FIGURE 11 is a fragmentary side view of the dressing mechanism and showing an alternate form of sensing mechanism for actuating the pneumatic control valve;

FIGURE 12 is a longitudinal sectional view on an enlarged scale through the sensing shoe of the FIGURE 11 device; and FIGURE 13 is a transverse sectional view along line 13—13 on FIGURE 12.

Figure 1:
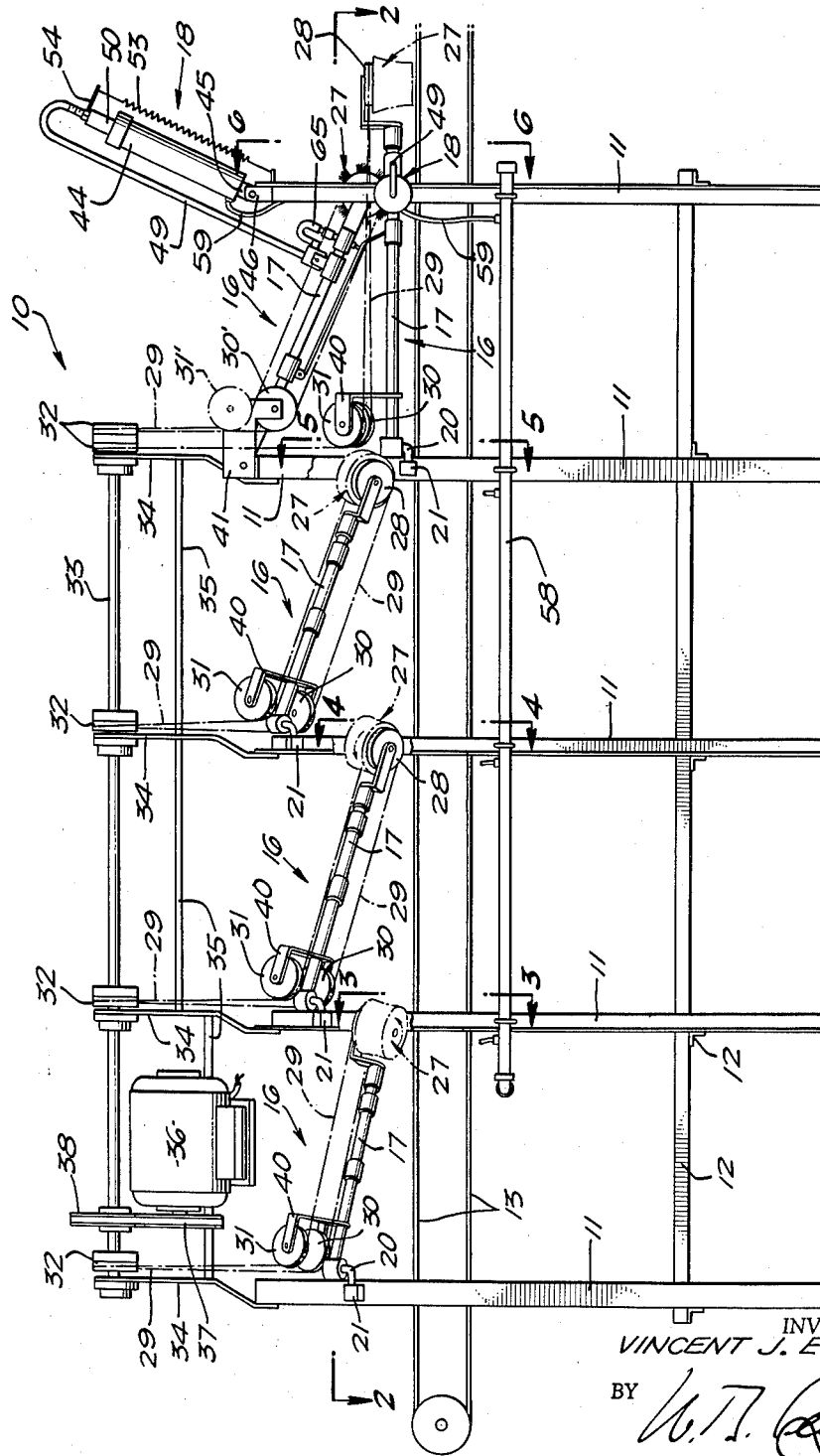
FIGURE 1 is a fragmentary side elevational view of an automatic dressing apparatus according to the present invention and showing portions only of the dressing tools and associated auxiliaries in order to avoid confusing the showing.

Referring more particularly to FIGURES 1 and 2, there is shown a preferred embodiment of an automatic dressing apparatus designated generally 10, incorporating the present invention and having an elongated main frame formed by a plurality of inverted U-shaped angle iron members 11, 11 rigidly interconnected by suitable cross and longitudinal bracing 12, 12 welded or otherwise secured between the legs of the U-shaped members. A conveyor belt 13, preferably formed of pivotally connected intermeshing strips, is suitably supported lengthwise of the main frame at a convenient operating height with its upper run supported flat in any conventional manner. A preferred manner of holding the upper run of mesh conveyor belt 13 horizontal is indicated in FIGURES 3 to 6 as comprising a pair of angle irons 14, 14 disposed as indicated with one flange of each underlying the opposite lateral edges of the belt, angle irons 14 having been omitted from FIGURE 1 for clarity in the showing of other components. Conveyor belt 13 may be supported beyond the opposite ends of the dressing machine frame by driving and idler rolls in any conventional manner, and to operate past loading and unloading stations, as found suitable and convenient in a particular operating environment.

Spaced along conveyor 13 and supported thereabove by the bight portions of the U-shaped frame members 11, 11 are a plurality of pairs of power-driven dressing roll assemblies designated generally 16. Each assembly 16 includes a pivoting support arm 17 having one end pivoted to the machine frame. Mounted on the other end of arm 17 is a dressing roll or brush 27 arranged to be driven from a central prime mover motor 36. The outer end of each arm 17 is adjustably supported by a power unit 18 automatically operable to shift the dressing roll as required to maintain the same at a uniform cutting depth relative to the surface of an object to be dressed as it is advanced past the roll by conveyor 13. It will be understood that, in general, the dressing rolls operate in pairs and are movable toward and away from the center of the conveyor belt in inclined planes, whereby the dressing rollers of each pair tend to engage the opposite lateral sides of a fish or other object being dressed as it is conveyed therepast. It will also be understood that the automatic positioning cylinders 18 for arms 17 are similar to one another, there being a separate positioning cylinder for each of the dressing arms. For the most part, a showing of these cylinders has been omitted in FIGURES 1 and 2 to avoid needless confusion.

The construction details of the dressing roll mounting and of actuating assemblies 16 will now be described, particular reference being had to FIGURES 1 and 7. As is there shown, one end of rigid arms 17 is journaled on one leg 20 of an L-shaped bracket 21 welded or otherwise rigidly secured at 22 to one of the main frame members 11. The pairs of arms 17, 17 shown to either side of conveyor belt 13 in FIGURES 6 and 7 swing toward and away from one another in a nearly horizontal plane in order that dressing rolls 27 carried by these arms will be positioned to dress the opposite lower sides of a fish fillet passing therebetween. The third arm 17 extending centrally of FIGURE 7 is pivotable in a vertical plane about its fixed pivot pin 20, the bracket for the latter being secured to the top of frame member 11. Rigidly secured, as by welding 24, to the outer end of each arm 17 is an L-shaped bracket 25 (FIGURE 9) for supporting a stationary spindle 26 for a dressing roll 27. The construction features of the rolls proper will be described following a description of the belt drive for the rolls.

Fixed in any suitable manner to one end of each roll 27 is a pulley 28 supporting a V-belt 29 which is trained over a pair of idler pulleys 30, 31 and a driven pulley 32 secured to a main power shaft 33. This shaft is supported on brackets 34 centrally above main frame of the apparatus, these brackets being suitably braced as by struts 35 interconnecting and welded to brackets 34. Main shaft 33 is driven from a single prime mover motor 36 suitably supported on the machine frame, as by brackets 34 and connecting strut 35, and drives shaft 33 by a belt 37 and a main drive pulley 38.

An important feature of the drive for dressing rolls 27 is the support of idler pulleys 30, 31 on a supporting mule 40 and so arranged relative to the dressing roll pulley 28 and to the driving pulley 32 on the main shaft as not to change the effective lengths or the tension of the belt runs as the roll-supporting arm 17 pivots through its operating range toward and away from the meat being dressed. Note from FIGURE 7 that idler pulleys 30 and 31 are disposed closely to either side of arm 17 and as close as practicable to the pivot axis of arm 17. It is pointed out that the points of contact of the belt runs with the grooves in pulley 32 and idlers 30 and 31 lie in or in close proximity to a plane passing through these points of contact and the pivot axis of arm 17 and bracket leg 20. Idler pulley supporting mules 40 are generally similar to one another except for mule 41 supporting the idler pulleys 30', 31' for the single vertically pivoting dressing roll positioned directly between the two foremost dressing rolls. Mule 41 is generally T-shaped with the stem of the T being rigidly secured to the top of frame 11 adjacent one end of bracket 21 for arm 17.

Power actuating means (FIGURES 1 and 7) for raising and lowering arms 17 to maintain dressing rolls 27 in the proper operating position comprises a pneumatic cylinder 44 having one end 45 firmly supported through a pivot pin mounted on a stationary member, such as a bracket 46 welded or otherwise attached to main frame 11. Slidably supported in cylinder 44 is a piston 48 having a hollow piston rod 49 slidably supported in cylinder end cap 50 and having its outer end reversely bent and pivotally secured at 52 to the outer end of an associated one of arms 17. It will be understood that the bore of tube 49 registers with a passage 60 passing through piston 48. Piston 48 is biased toward the pivoted end of cylinder 44 as by a tension spring 53 having one end anchored to machine frame 11 and the other end supported by a threaded bracket 54 adjustable along threaded portion 55 of piston rod 49. By temporarily detaching spring 53 from bracket 54 the latter may be shifted along the piston rod, it being recognized that the bracket cooperates with an extension on end cap 50 to limit the inward movement of piston 48 along the cylinder. Once the adjustment has been made, spring 53 is reconnected to bracket 54.

The pressurized air supply for the similar actuating cylinders for each arm 17 includes an air supply manifold 58 extending along either side of the apparatus and having flexible connections 59 for conducting pressurized air of a predetermined controlled pressure into the lower end of each of cylinders 44. The only escape for this air is through passage 60 in piston 48 communicating with bore 61 of the tubular piston rod 49. As is made clear by FIGURE 8, the outer end of the hollow piston rod 49 terminates in a fitting 62 having a passage 63 communicating through a fitting 64 and a flexible tube 65 with control valve designated generally 66.

Control valve 66 performs the important function of varying the flow of fluid for actuating cylinders 18 in accordance with information supplied by the sensing mechanism now to be described, particular reference being had to FIGURE 8. The body of valve 66 comprises a threaded tube 67 adjustably secured in openings 68 provided near the outer ends of arms 17 and securable in any adjusted position therewithin by a pair of lock nuts 69. Slidably supported in body 67 is a cylindrical valve member 70 having a shoulder 71 on its inner end seating an annular valve member 72 of resilient material. Valve member 72 seats against a valve seat 73 formed on the inner end of a nipple 74 held rigidly assembled to body tube 67 by a coupling sleeve 78. A flexible tube 65 interconnects nipple 74 and fitting 64 secured to the outer end of piston rod 49. The inner end of valve member 70 is stepped and includes a cylindrical extension 75 merging with a tapered section 76 and a small cylindrical tip. The cooperation of cylindrical portion 75 and tapered section 76 with the interior bore of nipple 74 is of considerable importance, and accounts in large measure for the smooth and accurate functioning of the actuating cylinders controlling the operating positions of the dressing rolls. It should be pointed out that valve member 70 is held detachably in assembled position by a pin 80 having a press fit with a transverse bore through member 70, the opposite ends of pin 80 being freely movable along a pair of slots 79 formed lengthwise of sleeve 78 and also serving as the air discharge ports for valve 66.

The combined sensing shoe and operator for valve 66 according to one preferred embodiment comprises a lightweight rigid shoe 85 (FIGURE 7) having one end pivotally supported by a bracket 86 slidable along arm 17 and held in a desired position by a set screw, not shown. The free end 87 of shoe 85 is normally positioned closely adjacent the rear of dressing roll 27 with the lower surface of end 87 in contact with the surface to be dressed.

When the described components are in their normal operating positions, valve member 70 is held displaced from its seat 73 by the fluid pressure and in such position as to vent fluid from cylinder 44 at the same rate at which it is being supplied thereto from manifold 58. Under these conditions fluid at a predetermined constant pressure is trapped behind piston 48 and cooperates with spring 73 to maintain the associated driven dressing roll 27 rigidly in position to remove a surface layer of predetermined thickness from the object undergoing dressing, it being understood end 87 of shoe 85 then rides in light contact with the surface being removed as that surface advances beneath the rotating dressing roll. Should a higher portion of the object advance beneath end 87 of the sensing shoe, this higher area will first contact end 87 and swing shoe 85 in a direction to urge valve 70 toward seat 73 thereby restricting the escaping fluid. In consequence, fluid accumulates behind piston 48 to shift the piston along the cylinder thereby moving arm 17 and the dressing roller carried thereby away from the surface being dressed. As this occurs, valve 70 and sensing shoe 85 follow the movement of arm 17 thereby increasing the volume of escaping air to re-establish and maintain the new position of the dressing roll so long as the height of the object being dressed remains the same. In these circumstances, valve 70 is positioned to allow the same quantity of air to escape from the cylinder as enters through flexible hose 59. It is pointed out and emphasized that, under these conditions, arm 17 is rigidly supported by the combined but opposed action of the air pressure on piston 48 and the action of spring 53 on piston rod 49 with the result that the dressing rolls are highly effective in dressing the toughest of meats, skins, and the like. Moreover, the sudden transition from tough to soft spots has no effect on the position of the rolls. It will also be understood that the rigid support thus provided does not detract from the sensitivity of the automatic servo control just described to change the position of the dressing roll automatically and instantly as necessary to follow the contour of the object undergoing dressing.

Each arm 17 is provided with a guard member 90 (FIGURES 7 and 8) functioning to prevent the collection of detached material behind shoe 85. The guard has a slot 91 through which a cap screw clamp 92 extends into a threaded bore in a bracket 25 telescoped over the outer end of arm 17. The curved lower end of guard 90 overlies the shoe 85 and cooperates therewith and with the dressing roll in preventing removed dressing from accumulating between the arm and the shoe and about valve assembly 66.

Another related feature is the provision of a guard member 94 (FIGURE 9) having one end anchored to bracket 25 as by welding 95. Guard 94 is preferably formed of resilient spring material and has its free end 96 shaped to fit loosely within the belt seating groove of pulley 28 and cooperates therewith in preventing the accumulation of dressings from collecting in the belt groove of the pulley.

Constructional details of the dressing rolls 27 are a feature of the invention and will be described by reference to FIGURES 7, 9 and 10. Each roll includes a tubular hub 98 having a plurality of circumferentially-spaced outwardly-opening channels 99 extending lengthwise thereof. Firmly seated and anchored in channels 99 are a multiplicity of resilient U-shaped fingers 100 preferably formed from spring steel, there being two or more such fingers nested one within the other in the present showing. When so nested, a desired degree of rigidity and flexibility is obtained which is found to give superior results and long service life. The rows of nested fingers are held pressed into seating channels 99 by keeper bars 101, each having a detent pin 102 at one end seating in a well in the face of pulley 28. The opposite end of keepers 101 are anchored to the hub 98 by cap screws 103.

As clearly appears from the drawings, resilient fingers 100 terminate so as to provide a desired curvature conforming generally to the contour of the surface to be dressed. The fingers in each dressing roll may be similarly or differently contoured depending upon the shape of the object being dressed and the disposition of the dressing roll to that surface. The differing contours of the rows of fingers in the various rolls as designed for dressing fish fillets are indicated by the dot and dash lines of the rolls in FIGURES 3 to 6.

Attention is also called to the fact that the rows of resilient fingers are spaced a considerable distance apart to avoid the collection and impacting of removed flesh between the fingers. When spaced substantially in the manner indicated by the drawings and particularly by FIGURE 7, the dressing rolls are rendered substantially self-cleaning since any material tending to cling to the fingers is quickly detached by centrifugal action or is readily removed by playing a high velocity stream of flushing water to the rolls.

Hub 98 is supported on spindle 26 by a pair of ball bearing assemblies 108, the outer races of which seat in wells at the remote end faces of hub 98 and pulley 28, the roll assembly being held on the spindle as by a spring keeper ring 109 seating in a groove 110 on the spindle. This unitary assembly is detachably secured to bracket 25 by a nut 112 tightened over the threaded end of spindle 26. Desirably, a spacer washer is inserted between a shoulder on spindle 26 and the inner side of bracket 25 to hold the pulley out of contact with the bracket. Accordingly, it will be understood that the dressing rolls 27 and their driving pulleys 28 are removable as a unit simply by removing nut 112.

The operation of the described dressing machine will be best understood from the foregoing description of the components taken in connection with FIGURES 3 to 6 showing the manner in which the various dressing rolls cooperate in dressing a pair of side quarters of fish as these pass the several dressing rolls. It will be understood that in the processing of fish, the fish are preferably but not necessarily pre-processed in other machinery of known construction operable to fillet the fish, remove the heads, tails and fins and to divide the body portion into four quarters. The two quarters forming one side half may then be placed flesh-side-down on the open mesh conveyor belt 13 and in the positions clearly indicated in FIGURES 3 to 6.

So long as no fish is present beneath the dressing rolls, each will occupy a preadjusted inner position closely adjacent conveyor belt 13 as determined by the adjustment of stop nut 54 (FIGURE 7) on the exposed end of piston rod 49. At such times, the air pressure in valve nipple 74 will hold valve member 70 open and sensing shoe 85 will be held closely adjacent the outer end of valve member 70 by suitable stop means associated with its pivot support 86. Whenever conveyor 13 is in operation, motor 36 will also be energized to drive main shaft 33, belts 29, and dressing rolls 27, each of which is driven in a direction to cast removed surface tissue forwardly onto conveyor belt 13.

The first pair of dressing rolls encountered by the advancing fish are those illustrated in FIGURE 3 which are adjusted to remove scale, skin and surface tissues in the ten and two o'clock positions, respectively, of fish quarters 115. The advancing fish first contact the cammed portion of shoe 85 adjacent end 87 causing the shoe to pivot toward valve member 70. Movement of valve 70 toward seat 73 restricts the escape of air from the inner end of cylinder 44 so that the air pressure increases and moves piston 48 and rod 49 in a direction to move arm 17 and dressing roll 27 away from its minimum position of rest. This movement continues as described (and very rapidly if necessary) to position roll 27 properly for dressing as the foremost portion of the fish lies under fingers 100 of the roll. Under these normal operating conditions, the sensing shoe surface 87 actually lies close to or slightly within radial distance to the tips of fingers 100 in which position rolls 27 are effective to remove a thin layer from the surface of the fish. It will also be understood that valve 70 is then positioned to by-pass the same quantity of air as is entering the cylinder unless the contour of the fish is changing. In the latter event, sensing shoe 85 moves automatically as necessary to maintain the dressing roll at a uniform cutting depth. In this connection it will be understood that the sensing shoe operates the valve to vent air faster than it enters the cylinder in order to lower the dressing roll, and to vent air slower than it enters the cylinder to raise the dressing roll away from the fish.

The other dressing rolls and the associated automatic control units associated therewith shown in FIGURES 4, 5 and 6 function in precisely the same manner, it being clear that each is positioned to swing in a different plane in order to dress different longitudinal strip areas of the meat undergoing processing.

Owing to the fact that each of a given pair of dressing rolls operates in opposition to one another on opposed sides of the meat passing therebetween, the pressure exerted by the rolls does not tend to shift the meat on the conveyor belt. The mesh character of the conveyor belt also cooperates with this disposition of the dressing rolls in preventing shifting of the fish across the surface of the conveyor. Immediately that one piece of meat has cleared a given pair of rolls, the sensing shoes pivot away from arms 17 to the limit permitted by stops, valve members 70 then opening allowing the pistons to move the dressing rolls inwardly to their minimum positions in instant readiness to dress the next advancing piece of meat. No particular spacing of the meat sections along the conveyor is necessary, and the conveyor may be maintained fully or partially loaded without any effect whatever on the efficiency and uniformity of the dressing operation. Alternatively, there may be long or short gaps between fish fillets without affecting the results produced since each dressing roll is instantly and independently adjusted by each piece of fish as its approaches the dressing roll.

Referring now to FIGURES 11, 12 and 13, there is shown a modified dressing roll assembly and servo-controlled power-actuated support therefor. It will be understood this embodiment is constructed in the same manner described in connection with the first embodiment with the exception of the sensing shoe employed to actuate control valve 66' for the pneumatic cylinder. For this reason, the same reference characters used in the first embodiment are applied to the corresponding components of the alternate embodiment but are distinguished by the addition of a prime. The first described sensing shoe is not as sensitive to rapidly changing contours of objects being dressed as is desirable for precise dressing.

The modified sensing shoe illustrated in FIGURES 11, 12 and 13 overcomes this shortcoming and additionally provides simple, easily-operated means for adjusting the shoe as will now become apparent from the following description of its structure and mode of functioning.

Shoe 85' includes a long straight and rigid arm having its rear end pivotally connected at 86' to the underside of arm 17'. Pivotally secured to arm 85', as by clip 115, is the bight portion of a rigid U-shaped bracket 116, legs 117 of which are located closely adjacent either end face of dressing roll 27'. A broad plate-like sensing shoe 118 of sheet metal, plastic or other suitable material is provided with a large area cut-out 119, the opposite lateral edges of which are provided with tabs 120 journaled on trunnions 121, 121 in axial alignment with one another and projecting inwardly from the adjacent sides of bracket legs 117. As is best shown in FIGURES 12 and 13, sensing shoe 118 is arched upwardly along its longitudinal center and conforms generally in shape to the contour of dressing roll fingers 100', the contour of the latter being indicated by dot and dash line 125 in FIGURE 13.

Shoe 118 supporting bracket 116 is preferably adjustable relative to arm 85' in order to locate its arched lower surface in a desired operating position with respect to the ends of fingers 100' of the dressing roll. Various arrangements may be employed for this purpose, as for example, the adjustment shown in FIGURE 11 employing a single screw 123 threaded through arm 85' and having a shouldered lower end 124 seated loosely in a bore through a cross piece 125 rigidly interconnecting bracket legs 117. A split ring keeper 126 or the like holds the shouldered end of screw 123 assembled within the bore through cross piece 125. A lock nut 127 serves to lock the adjustment in any desired setting.

It will be observed that bracket legs 117 overlie the opposite lateral edges of sensing shoe 118 and are therefore effective to limit tilting of the shoe about trunnions 121. Since the axes of trunnions 121 lie substantially directly below the axis of dressing roll 27', it will be recognized that the described servo-control mechanism is operable to maintain the dressing roll at the proper height with respect to the surface actually undergoing dressing irrespective of rapidly changing contours of the fish forwardly or rearwardly of the point of actual contact.

It will be understood that the alternate form of sensing shoe functions precisely in the same manner as described in connection with the first embodiment except the large area floating shoe 118 is readily tiltable crosswise of the path of advance of the fish and is therefore effective to anticipate as well as to measure rates of change in the surface contour and to transmit significant signals and corrective movements to valve 70.

While the particular automatic dressing apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In combination, an automatic machine for dressing non-uniform and irregularly contoured objects, said machine being of the type having conveyor means for conveying objects to be dressed past a dressing station having there movably supported at least one power-driven dressing tool positioned to be engaged by said advancing objects for the purpose of removing a layer of predetermined depth; that improvement which comprises feeler means movably mounted on said dressing tool and having a surface positioned to contact an advancing object closely adjacent the area undergoing dressing by said tool, power means for controlling the position of said tool with respect to said conveyor and with respect to an object supported thereon while passing beneath said tool, and mechanically operated valve means operatively connected to and controlled by the position of said feeler means relative to the surface undergoing dressing by said tool to control said tool-positioning power means to maintain said tool in a predetermined operating position relative to the juxtaposed surface of the object notwithstanding the changing surface contour thereof to remove a surface layer of predetermined depth.

2. In combination, an automatic machine for dressing non-uniform and irregularly contoured pieces of meat, said machine being of the type having conveyor means for conveying pieces of meat past a dressing station having there movably supported at least one power-driven dressing tool positioned to be engaged by said advancing pieces of meat for removing a surface layer therefrom of a desired thickness; that improvement which comprises feeler means movably mounted on said dressing tool and having a surface positioned to contact an advancing piece of meat, power means for controlling the position of said tool with respect to said conveyor and with respect to a piece of meat supported thereon while passing beneath said tool, means controlled by the position of said feeler relative to the surface undergoing dressing by said tool and operative to control said tool-positioning power means to maintain said tool in a predetermined operating position relative to the juxtaposed surface of a piece of meat while being conveyed past said tool, said tool being operable to remove a surface layer of meat to a depth determined by the relative positions of said feeler and of said tool, and means for adjusting the relative positions of said tool and feeler to vary the thickness of the layer removed by said dressing tool.

3. In combination, an automatic machine for dressing non-uniform and irregularly contoured pieces of meat, said machine being of the type having conveyor means for conveying pieces of meat past a dressing station having there movably supported at least one power-driven dressing tool positioned to be engaged by said advancing pieces of meat and operable to remove a surface layer therefrom of uniform depth; that improvement which comprises feeler means movably mounted on said dressing tool and having a surface positioned to contact an advancing piece of meat, power means for controlling the position of said tool with respect to said conveyor and with respect to a piece of meat supported thereon while passing beneath said tool, pneumatically actuated means controlled by the position of said feeler relative to the surface undergoing dressing by said tool and operable to control said tool-positioning power means to maintain said tool in a predetermined operating position relative to the juxtaposed surface of a piece of meat while being conveyed past said tool, and said feeler including mechanically operated valve means operable to control the flow of operating fluid for said pneumatic actuated power means.

4. An automatic meat dressing machine as defined in claim 1 characterized in that said machine includes a plurality of similarly actuated and controlled power-driven dressing tools distributed along said conveyor and movable toward and away therefrom in a plurality of planes inclined differently to the axis of movement thereof.

5. An automatic meat dressing machine as defined in claim 4 characterized in the provision of a single source of power connected to a plurality of said dressing tools.

6. An automatic meat dressing machine as defined in claim 4 characterized in that each of said dressing tools includes a separate powered support and in that each of said dressing tools is movable independently of the other tools.

7. In combination, a meat dressing machine having power operated conveyor means operating past a meat dressing station, said dressing station having a power-driven tool movable toward and away from meat carried by said conveyor, power means movably supporting said tool for movement selectively to various operating positions, control means connected with said power means and operable to control said power means in response to the dressing position of said tool with respect to the surface of meat undergoing dressing, said control means including surface sensing means maintained in floating contact with the meat as it advances and operable to effect movement of said dressing tool toward and away from the surface of meat being dressed thereby, said tool being operable to remove a surface layer of said meat to a preselected depth.

8. A meat dressing machine as defined in claim 7 characterized in that said control means includes air venting valve means responsive to the slightest movement of said sensing means to vary the flow of pressurized fluid to said power means thereby to control the position of said power-driven tool.

9. A meat dressing machine as defined in claim 8 characterized in that said power means comprises a cylinder pivotally supported at one end, a piston having a tubular piston rod slidably supported in the other end of said cylinder, said piston rod being operatively connected to said tool and effective in response to movement of the piston along said cylinder to move the tool toward and away from meat on said conveyor, said air venting valve means being located in said tubular piston rod and being operable to control the position of said piston in accordance with the amount of air permitted to escape past said valve means to the atmosphere.

10. A power-driven surface dressing tool mounted on a pivotally supported rigid arm, a feeler carried by said arm for contacting the surface being dressed in an area closely adjacent said tool, a pneumatic cylinder having one end pivotally supported with the cylinder axis lying in the pivotal plane of said arm, a piston in said cylinder having a tubular piston rod pivotally connected at its outer end to said arm to pivot the same as said piston moves along said cylinder, means supplying pressurized fluid to one end of said cylinder, and valve means controlling the venting of fluid from said cylinder at a variable rate depending upon the position of said feeler relative to the cutting edge of said tool and effective to change the position of the tool automatically as required to maintain the same substantially in a predetermined position relative to the juxtaposed surface of the object undergoing dressing.

11. A power-driven rotary surface dressing tool adapted to dress away to a predetermined depth the juxtaposed surface of an object conveyed therepast, said dressing tool comprising, in combination, a power-driven cutter, means movably supporting said dressing tool for movement toward and away from planar conveyor means adapted to transport objects to be dressed past said tool, pneumatic cylinder means having one end anchored, a piston and piston rod assembly slidably supported in said cylinder, means connecting the outer end of said rod to the movable support means for said dressing tool, movable feeler means carried by said tool support and engageable with the surface of an object to be dressed in an area close to said tool, and valve means controlled by said feeler means and operable to vent fluid from said cylinder at a variable rate as necessary to maintain said tool in position to dress away to a predetermined depth the juxtaposed surface of an object undergoing dressing.

12. A surface dressing machine is defined in claim 11 characterized in the provision of a plurality of independent dressing tools and associated feeler control valve means, said independent dressing tools being spaced along the path of travel of objects being conveyed through said machine for dressing.

13. A surface dressing machine is defined in claim 12 characterized in that said dressing tools comprise rotatable hubs having rigidly fixed thereto rows of radially-extending circumferentially-spaced resilient fingers and having their ends contoured lengthwise of said rows to dress objects conveyed therepast with a desired surface contour.

14. A surface dressing machine as defined in claim 11 characterized in the provision of spring means connected between said piston and a stationary portion of said machine effective to bias said piston and the dressing tool controlled thereby toward the object to be dressed, and further characterized in that the fluid pressure within said cylinder is effective to urge said valve means toward open position when not urged toward closed position by said feeler means in contact with the surface of an object being dressed, whereby said spring is operable to maintain said dressing tool normally close to said conveyor means and in instant readiness to dress an object of minimum thickness as the object advances toward said dressing tool on said conveyor means.

15. A surface dressing machine adapted to remove a surface layer of predetermined depth from irregularly contoured objects transported therethrough on conveyor means, said dressing machine comprising, in combination, conveyor means, a plurality of independent power-driven dressing tools mounted for swinging movement toward and away from said conveyor means, a common driving shaft for said tools, belt and pulley means coupling said tools to said drive shaft and arranged to maintain said belts under substantially uniform tension as said tools swing toward and away from said conveyor means, power-actuated positioning means connected to each of said tools and including sensing mechanism for controlling the operation of said positioning means, said sensing mechanism being operable in cooperation with said power actuated positioning means to maintain each of said tools at a predetermined cutting depth delative to the juxtaposed surface of each object undergoing dressing as the latter is conveyed past the respective tools.

16. Fish dressing apparatus comprising mesh-type conveyor means for conveying fish fillets past a dressing station, a plurality of rotatable brush-like dressing rolls, independently movable supporting arms carrying said rolls, means for constraining said arms and the dressing rolls mounted thereon to move in different planes converging toward the opposite lateral and top surfaces of fish fillets being conveyed therepast by said conveyor, means for driving said dressing rolls from a common power source, power actuated means coupled to and operable to vary the position of said rolls relative to the juxtaposed surface of a fish fillet as the same is conveyed past said rolls, and means including mechanical sensing means for controlling the position of said power actuated means, said sensing means being movable with the associated one of said rolls and being operatively connected to the associated power actuated means for maintaining each roll in a predetermined operating position relative to the juxtaposed portion of a fish fillet.

17. Fish dressing apparatus as defined in claim 16 characterized in that said rolls are arranged in pairs spaced longitudinally of said conveyor belt and so supported that the rolls of a given pair operate in planes converging against a passing fillet at substantially the same angle but from the opposite lateral sides of the fillet whereby the roll pairs cooperate with one another in holding a fillet pressed against said mesh conveyor while upper surface areas thereof are being dressed.

18. In a fish dressing apparatus, the combination of a main frame, a rotary dressing roll adapted to dress away an underlying surface layer of a fish fillet while the latter is being conveyed past said roll, a supporting arm having one end pivoted to said frame for movement in a predetermined plane toward and away from a fish fillet as the fillet is conveyed therepast, a main power shaft lying generally parallel to the path of movement of said supporting arm, belt pulleys fixed to said shaft and to said rolls, idler pulleys supported closely adjacent and on the opposite sides of the pivot axis of said roll supporting arm and so related to the associated roll and to said shaft drive pulleys as to avoid any substantial change in the tension of a drive belt supported by said pulleys, and a drive belt supported by each set of said idler, drive and roll pulleys.

19. A flow control valve for use in a surface dressing apparatus to control the venting of fluid from a pneumatic cylinder employed to maintain a driven dressing roll in a predetermined surface-dressing position with respect to an object advancing therepast and undergoing dressing, said valve having an exteriorly threaded tubular main body, an annular valve seat spaced axially from one end portion of said threaded body, an elongated member loosely slidable in said threaded body and having an annular valve member supported near one end thereof adapted to seat against said valve seat, said valve member including a generally cylindrical tip extending past said valve seat and cooperating with the juxtaposed cylindrical interior wall of said body to restrict flow therepast in the open position of said valve member, a converging end on said tip effective to permit rapidly increasing flow to take place as said converging tip is moved outwardly past the plane of said valve seat, stop means cooperable with said valve member to permit the same to move axially of said threaded main body between fully closed and fully open positions, and a movably supported sensing member bearing against the outer end of said slidable valve member and operable to control the position of the latter relative to said valve seat.

20. A surface dressing machine as defined in claim 11 characterized in that said feeler means comprises sensing shoe means supported for pivotal movement about an axis parallel to the axis of said power driven dressing tool and spaced relatively close to the surface undergoing dressing.

21. A surface dressing machine as defined in claim 20 characterized in that said sensing shoe means is cut away in the central portion thereof to provide an opening into which said dressing means projects to contact the object being dressed.

22. In combination with apparatus for dressing meat and fish fillets having convexly curved exposed surfaces and including conveyor means for advancing the material to be dressed past a dressing station; that improvement which comprises means supporting a plurality of power-driven dressing rolls at said dressing station with the axes thereof arranged in an arc extending transversely of the path of travel of said conveyor means, said dressing rolls having hubs provided with rows of radially-disposed resilient fingers free of hooks at their ends, said dressing rolls having concavely contoured surfaces of revolution generally complemental to the convexly contoured surfaces of the material to be dressed whereby said dressing means are effective in cooperation with one another to dress away a thin layer of convexly contoured material as the same is advanced past said dressing station, and said rows of fingers diverging outwardly whereby dressing scrapings are readily dislodged therefrom by centrifugal and vibratory action to prevent fouling of said dressing rolls.

References Cited in the file of this patent

UNITED STATES PATENTS

| | | |
|---|---|---|
| 1,615,134 | Price | Jan. 18, 1927 |
| 1,694,018 | Mudge | Dec. 4, 1928 |
| 2,245,545 | Miller et al. | June 10, 1941 |
| 2,406,914 | Sievers | Sept. 3, 1946 |
| 2,565,727 | Henderson | Aug. 28, 1951 |
| 2,683,893 | Baader | July 20, 1954 |
| 2,701,119 | Smith | Feb. 1, 1955 |
| 2,768,666 | Garapolo et al. | Oct. 30, 1956 |
| 2,893,052 | Schlichting | July 7, 1959 |
| 2,913,759 | Evich | Nov. 24, 1959 |